(12) United States Patent
Vermeer et al.

(10) Patent No.: US 6,213,368 B1
(45) Date of Patent: Apr. 10, 2001

(54) CONVEYOR STATION AND CONVEYOR FOR SAUSAGE MACHINES AND METHOD OF USING THE SAME

(75) Inventors: William H. Vermeer, Des Moines, IA (US); William E. Ryan, IV, Cary, NC (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 08/872,844

(22) Filed: Jun. 11, 1997

Related U.S. Application Data

(60) Provisional application No. 60/019,724, filed on Jun. 13, 1996, and provisional application No. 60/020,182, filed on Jun. 14, 1999.

(51) Int. Cl.[7] ................................................. B65G 15/02
(52) U.S. Cl. ............................................ 226/104; 452/51
(58) Field of Search .................................... 226/104, 105, 226/106, 107; 452/51

(56) References Cited

U.S. PATENT DOCUMENTS

| | | | |
|---|---|---|---|
| 3,296,657 | * | 1/1967 | Moekle ............................... 452/51 X |
| 3,505,081 | * | 4/1970 | Wallace ............................. 452/51 X |
| 3,620,431 | * | 11/1971 | Wallace ............................. 452/51 X |
| 3,792,508 | * | 2/1974 | Simonsen et al. ..................... 452/51 |
| 4,218,003 | | 8/1980 | Plewa et al. . |
| 4,880,105 | * | 11/1989 | Kasai et al. ......................... 452/51 X |
| 5,163,864 | * | 11/1992 | Burger et al. ......................... 452/51 |
| 5,197,915 | | 3/1993 | Nakamura et al. . |
| 5,896,809 | * | 4/1999 | Miller ............................... 452/51 X |

* cited by examiner

Primary Examiner—Michael R. Mansen
(74) Attorney, Agent, or Firm—Zarley, McKee, Thomte, Voorhees & Sease

(57) ABSTRACT

A conveyor station for a pair of sausage producing machines, has a pair of sausage producing machines capable of discharging a rope of sausages through a discharge end thereof. A pair of spaced elongated substantially parallel horizontal conveyors having one end of each adjacent the discharge ends of the machines, with the conveyors having adjacent sides. The conveyors have a continuous conveyor assembly adapted to rotate in a substantially horizontal plane to pick up and carry away the rope of sausage discharged from each machine. A power drive for rotating the conveyor assemblies in either a first or second rotational direction is operatively connected to the conveyor assemblies. A control element is on the power drive for rotating the conveyor assembly on one conveyor in a direction opposite to that of the conveyor assembly on the other conveyor so that the sausage ropes from both machines can be conveyed to adjacent sides of the conveyors, whereby an operator located between the conveyors can attend to the ropes being conveyed by the conveyors. An anti-swinging bumper is mounted on the machine along one side portion of the conveyor assembly to dampen the swinging movement of a sausage rope on the conveyor assembly, and support brackets for selectively mounting the anti-swinging bumper is secured along either of the side portions of the conveyor assemblies.

11 Claims, 3 Drawing Sheets

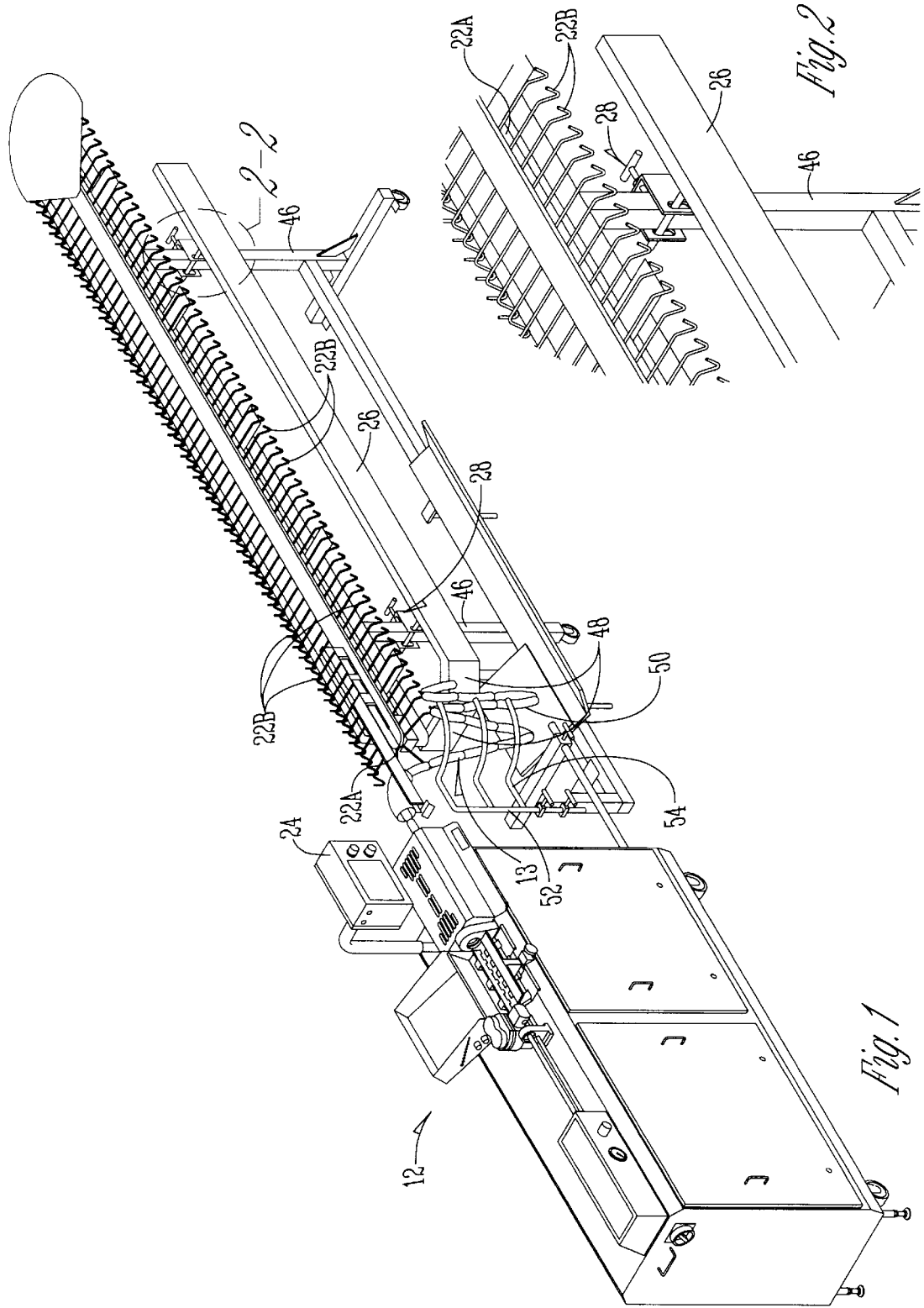

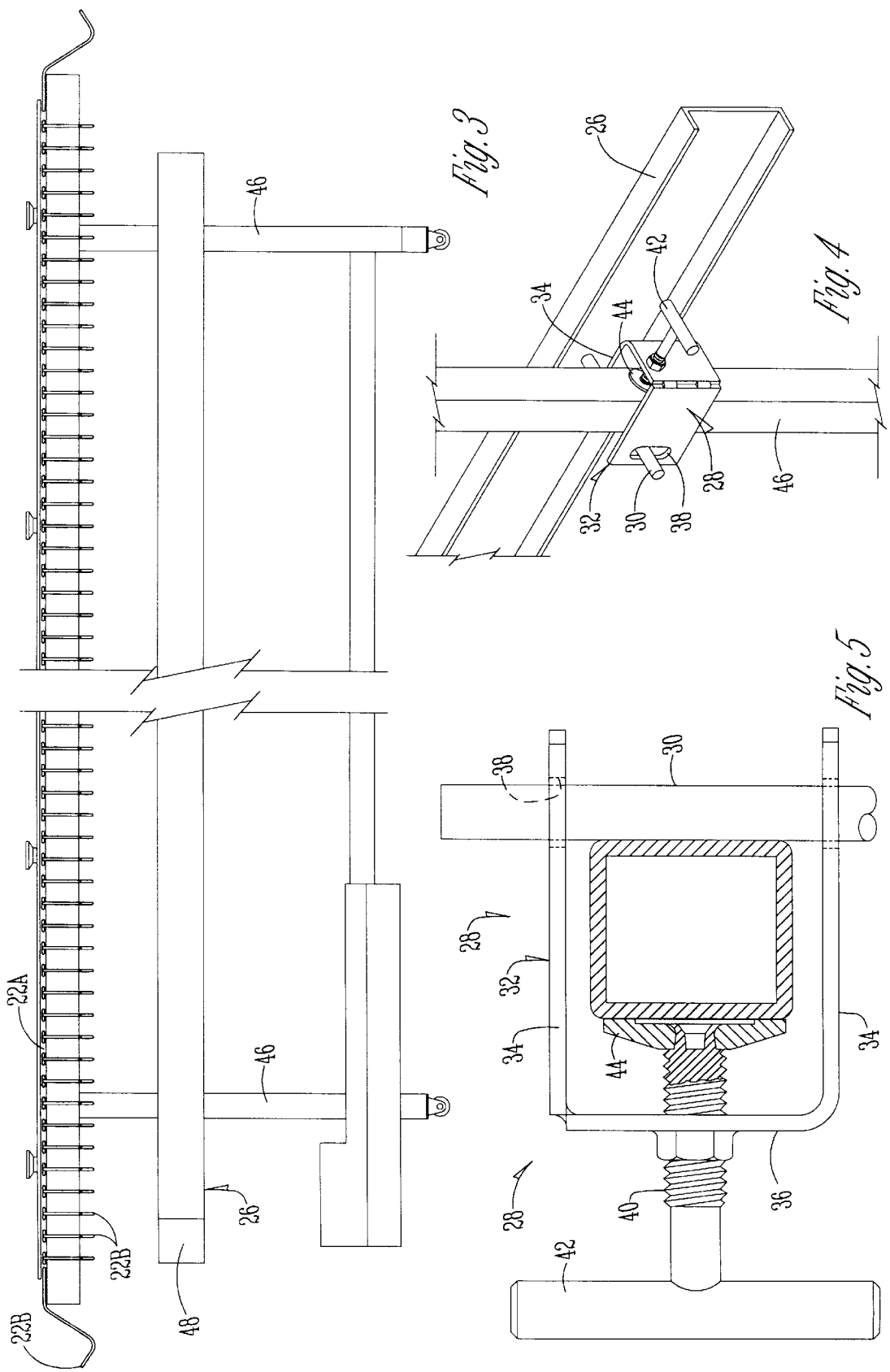

CONVEYOR STATION AND CONVEYOR FOR SAUSAGE MACHINES AND METHOD OF USING THE SAME

CROSS REFERENCE TO RELATED APPLICATION

This application is based upon the Applicants' Provisional Application Serial No. Provisional Application Ser. No. 60/019,724 filed Jun. 13, 1996 and 60/020,182 filed Jun. 14, 1996.

BACKGROUND OF THE INVENTION

Modern sausage encasing machines can produce up to 30,000 linked sausages per hour. These machines each have conveyors which serve to handle the elongated encased sausage ropes as they are discharged from the machines. A machine operator attends the operation of the machines and removes the sausage ropes from the conveyors. Typically, one operator is required to oversee each machine. This is primarily caused by the configuration of the conveyors which dispense the sausage ropes to one side of the elongated conveyor, thus making it difficult if not impossible for a single operator to simultaneously attend more than one machine.

Horizontal conveyors have been used in conjunction with sausage making machines. They have a horizontally disposed conveyor chain suspended on a frame with hook elements extending outwardly therefrom to receive loops of an encased sausage rope. The velocity of the chain imposed on the loops causes them to swing laterally from the hooks. This invites damage to the loops and occasionally a loop is ruptured.

It is therefore a principal object of this invention to provide an anti-sway bar to dampen the swinging motion of the suspended loops.

A further object of this invention to provide conveyors for sausage machines that will permit a single operator to attend two machines at the same time.

A further object of this invention is to provide a horizontal conveyor for a sausage encasing machine that has a continuous conveyor assembly operating in a substantially horizontal plane, and which can be selectively rotated in one of two directions so that an operator can stand between two oppositely rotating conveyors and thus attend both conveyors at the same time.

BRIEF DESCRIPTION OF THE DRAWINGS

FIG. 1 is a perspective view of one of the conveyors of this invention associated with a linking machine;

FIG. 2 is an enlarged scale perspective view taken on line 2—2 of FIG. 1;

FIG. 3 is an enlarged scale side elevational view of the conveyor shown in FIG. 1;

FIG. 4 is an enlarged perspective view of the support bracket for the anti-swinging bumper of the conveyor of FIG. 3;

FIG. 5 is an enlarged scale plan view of the support bracket of FIG. 4; and

SUMMARY OF THE INVENTION

Figure 6:
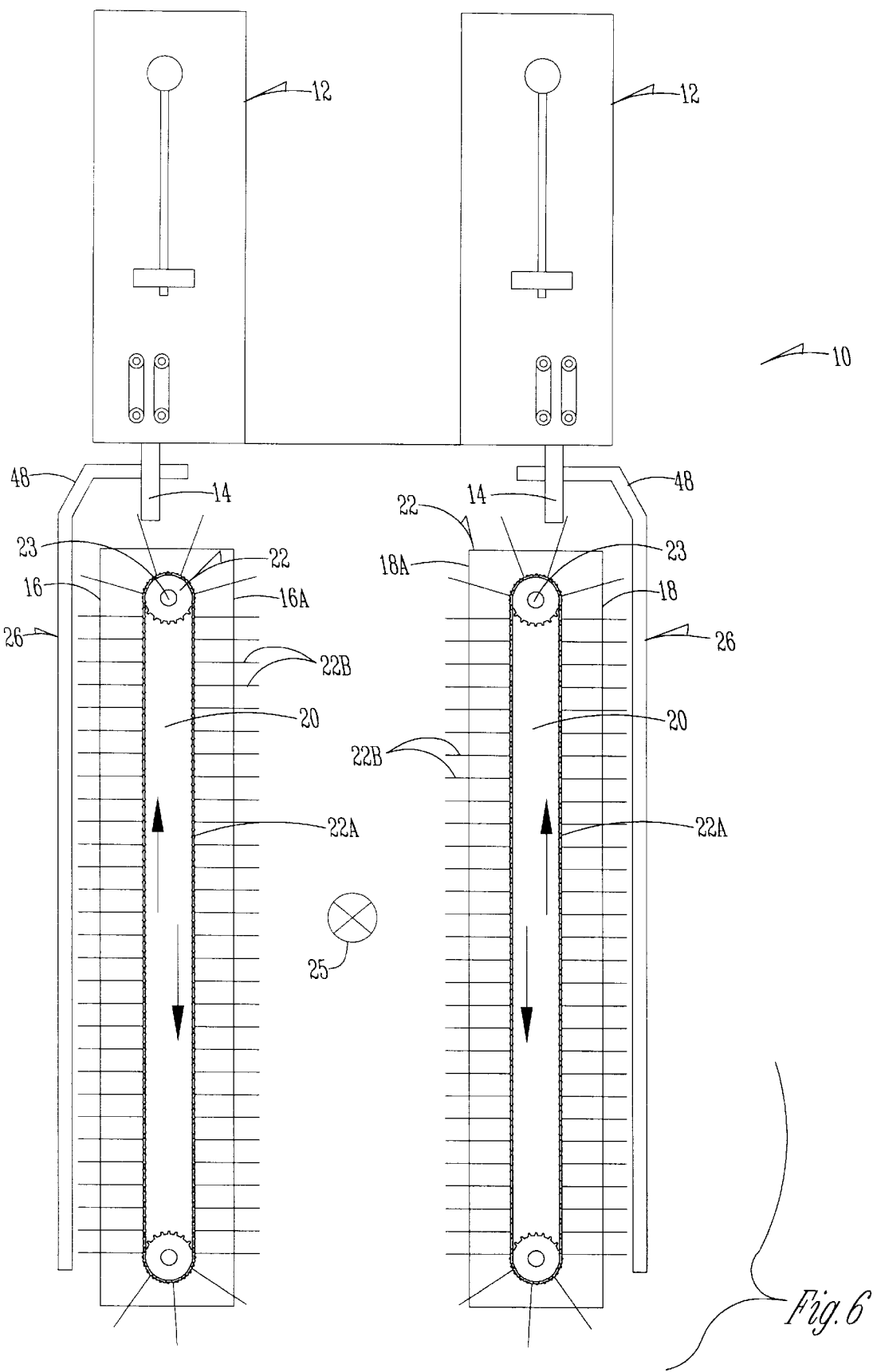
FIG. 6 is a schematic plan view of the conveyor station situated so that a single operator can attend simultaneously two sausage machine conveyors.

A conveyor station for a pair of sausage producing machines, has a pair of sausage producing machines capable of discharging a rope of sausages through a discharge end thereof. A pair of spaced elongated substantially parallel horizontal conveyors has one end of each adjacent the discharge ends of the machines, with the conveyors having adjacent sides. The conveyors have a continuous conveyor assembly adapted to rotate in a substantially horizontal plane to pick up and carry away the rope of sausage discharged from each machine. A power drive for rotating the conveyor assemblies in either a first or second rotational direction is operatively connected to the conveyor assemblies. A control element is associated with the power drive for rotating the conveyor assembly on one conveyor in a direction opposite to that of the conveyor assembly on the other conveyor so that the sausage ropes from both machines can be conveyed to adjacent sides of the conveyors, whereby an operator located between said conveyors can attend to the ropes being conveyed by the conveyors. An anti-swinging bumper means is mounted on the machine along one side portion of the conveyor assembly to dampen the swinging movement of a sausage rope on the conveyor assembly, and support brackets for selectively mounting the anti-swinging bumper is secured along either of the side portions of the conveyor assemblies.

DESCRIPTION OF THE PREFERRED EMBODIMENT

With reference to FIG. 6, the conveyor station 10 is comprised of two sausage making machines 12 which are conventionally adapted to discharge an elongated rope 13 (FIG. 1) of linked sausages from discharge horns 14.

Sausage conveyors 16 and 18 for the ropes 13 each have an upper portion 20 and a continuous horizontally disposed conveyor assembly 22 comprised of an endless chain 22A and outwardly extending hooks 22B. Each conveyor assembly is operatively connected to a power drive shaft 23 (FIG. 6) to rotate the conveyor assemblies in one of two directions shown by the arrows in FIG. 6. A computer control 24 (FIG. 1) is operatively connected to shaft 23 to permit these directions to be selected. By operating the conveyors 16 and 18 in the opposite directions shown in FIG. 6, a single operator can be positioned at location 25 in FIG. 6 and can attend both conveyors at the same time. The conveyors 16 and 18 are spaced substantially parallel and have adjacent side portions 16A and 18A (FIG. 6).

The elongated anti-sway bumper 26 or bar shown on the righthand side of the conveyor 18 of FIGS. 35 is mounted on the conveyor by means of a support bracket 28 (FIGS. 2–5). Horizontal rods 30 are welded by one of their ends to the inner side of bumper 26 adjacent the opposite ends thereof. Brackets 28 include a U-shaped member 32 having opposite sides 34 connected by wall portion 36. Each side 34 has a vertical slot 38 which has a width greater than the diameter of rods 30. The length of rods 30 is sufficient to extend completely through slots 38 (FIG. 4).

An elongated threaded bolt 40 is threadly mounted in wall portion 36. A transverse handle 42 is secured to the outer end of bolt 40, and a self-aligning clamp pad 44 is movably secured to the inner end thereof.

Bumpers 26 are mounted on vertical conveyor legs 46. Brackets 28 embrace legs 46, and bumpers 26 are aligned so that rods 30 penetrate slots 38 as shown in FIG. 4. The bumpers 26 and brackets 28 are moved to the desired height on legs 46. Then, bolts 40 are screwed inwardly into wall portion 36 so that pad 44 engages leg 46, whereupon the rod 30 enters into a binding relationship with the side of leg 46 opposite pad 44. Thus, the leg 46 is bound between rod 30 and pad 44.

The bumpers 26 can be moved upwardly or downwardly by loosening bolts 40, whereupon the above procedure is again followed after the bumpers are moved to the correct height.

The bumpers 26 can also be changed from one side to the other so that they can be positioned on the adjacent sides 16A and 18A of the conveyors 16 and 18, respectively. This is done by loosening bolts 40, removing the bumper, turning it over, moving it to the other side of the conveyor, and remounting it on legs 46. Thus, the arrangement of bumpers 26 of FIG. 6 can be easily arranged.

Bumpers 26 have an inwardly extending portion 48 at the end thereof adjacent machine 12 to engage the initial loops 50 of sausages as soon as they are formed. Portion 48 extends laterally across the inner ends of conveyors 16 and 18.

A loop restraining bracket 52 with arcuate spaced apart rods 54 prevent the loops 50 from swinging outwardly as they make a 90° change of direction as they depart from horn 14 and then move longitudinally down the outside of conveyors 16 and 18.

Under the arrangement of FIG. 6, computer control 24 can cause the conveyors 16 and 18 to move loops in the direction of the arrows so that one operator can operate both machines 12. Conveyors 16 and 18 are not symmetrical about their respective longitudinal center axes because of the "lefthand" and "righthand" locations of bumper 26. However, the conveyors 16 and 18 are mirror images of each other to create the working station of FIG. 6.

It is therefore seen that this invention will accomplish all of its stated objectives.

What is claimed is:

1. A conveyor station for a pair of sausage producing machines, comprising,
   a pair of sausage producing machines capable of discharging a rope of sausages through a discharge end thereof,
   a pair of spaced elongated substantially parallel horizontal conveyors having one end of each adjacent the discharge ends of said machines, with said conveyors having adjacent sides;
   said conveyors having a continuous conveyor assembly adapted to rotate in a substantially horizontal plane to pick up and carry away the rope of sausage discharged from each machine,
   power means for rotating-said conveyor assemblies in either a first or second rotational direction; and
   control means on said power means for rotating the conveyor assembly on one conveyor in a direction opposite to that of the conveyor assembly on the other conveyor so that the sausage ropes from both machines can be conveyed to adjacent sides of said conveyors whereby an operator located between said conveyors can attend to the ropes being conveyed by said conveyors.

2. The device of claim 1 wherein said anti-sway bar is adjustable vertically with respect to said upright members.

3. A conveyor for a sausage machine, comprising,
   a frame having a top portion,
   an elongated endless conveyor assembly mounted on said top portion in a substantially horizontal direction, and having opposite side portions;
   power means on said frame for rotating said conveyor assembly in a first or second direction; and
   control means operatively connected to said power means to selectively rotate said conveyor in said first or second direction.

4. The conveyor of claim 4 wherein an anti-swinging means is mounted on said machine along one side portion of the conveyor assembly to dampen the swinging movement of a sausage rope on said conveyor assembly, and support brackets for selectively mounting said anti-swinging bumper is secured along either of the side portions of the conveyor assemblies.

5. The conveyor of claim 4 wherein a loop restraining bracket comprising a plurality of spaced arcuate rods are operatively connected to one end of said conveyor assembly to dampen the outward swinging movement of a sausage rope on said conveyor assembly.

6. A conveyor for an elongated linked product rope for use with a sausage making machine, comprising,
   a frame having at least a pair of upright members having upper and lower ends,
   a continuous chain member disposed in a horizontal plane and mounted on the upper ends of said upright members, said chain having opposite parallel side portions and opposite circular end portions,
   a plurality of hook members extending outwardly from said chain member to receive an elongated linked product rope from a sausage making machine,
   means for rotating said chain member so that one side portion moves longitudinally from one circular end portion to the other end portion,
   an elongated anti-sway bar adjustably secured to said upright members below the one side portion of said chain member to laterally engage a loop of said elongated linked product rope suspended from said hook members to dampen any swinging action of said loop in a direction towards said upright members after said rope is deposited on said hook members.

7. The device of claim 6 therein a U-shaped bracket slidably embraces one each of said upright members with side members extending beyond the width of said upright members, an aperture in each of said side members, rods extending laterally from said anti-sway bar through the apertures in one end of said U-shaped brackets, and a clamp screw in each of said U-shaped brackets to engage said upright members to selectively bind said U-shaped brackets and said rods to said upright members to selectively position said anti-sway bar with respect to said upright members.

8. The device of claim 6 therein a loop restraining bracket comprising a plurality of spaced arcuate rods are operatively connected to one end of said conveyor assembly to dampen the outward swinging movement of a sausage rope on said conveyor assembly.

9. A conveyor station for a pair of sausage producing machines, comprising,
   a pair of sausage producing machines capable of discharging a rope of sausages through a discharge end thereof,
   a pair of non-symmetrical spaced elongated substantially parallel conveyors having one end of each adjacent the discharge ends of said machines, with said conveyors having adjacent sides;
   said conveyors having a continuous conveyor assembly adapted to pick up and carry away the rope of sausage discharged from each machine,
   power means for rotating said conveyor assemblies,
   said conveyors being a mirror image of each other as viewed from above so as to permit each conveyor to be attended from an operating position in the space between said conveyors.

10. The conveyor station of claim 9 wherein said power means can rotate said conveyor assemblies in opposite directions.

11. A method for handling an elongated linked rope product from a pair of sausage making machines, comprising, taking a pair of sausage producing machines capable of discharging a rope of sausages through discharge ends thereof, placing a pair of non-symmetrically spaced elongated substantially parallel conveyors having one end adjacent the discharge ends of said machines with said conveyors having adjacent sides, making said conveyors a mirror image of each other as viewed from above so as to permit each conveyor to be attended from an operating position in the space between said conveyors.

* * * * *

UNITED STATES PATENT AND TRADEMARK OFFICE
CERTIFICATE OF CORRECTION

PATENT NO.    : 6,213,368 B1
DATED         : April 10, 2001
INVENTOR(S)   : William H. Vermeer et al.

It is certified that error appears in the above-identified patent and that said Letters Patent is hereby corrected as shown below:

Column 4,
Line 1, delete the numeral "4" and insert the numeral -- 3 --.

Signed and Sealed this

Sixteenth Day of August, 2005

JON W. DUDAS
*Director of the United States Patent and Trademark Office*